US 10,998,799 B2

(12) United States Patent
Healey et al.

(10) Patent No.: US 10,998,799 B2
(45) Date of Patent: May 4, 2021

(54) POSITION SENSOR ASSEMBLY (71) Applicant: TRW Limited, Solihull (GB)

(72) Inventors: Guy Charles Healey, Upminster (GB); Rajendra Gopalji Sikotra, Leicester (GB)

(73) Assignee: ZF Automotive UK Limited

( * ) Notice: Subject to any disclaimer, the term of this patent is extended or adjusted under 35 U.S.C. 154(b) by 291 days.

(21) Appl. No.: 15/777,406

(22) PCT Filed: Nov. 17, 2016

(86) PCT No.: PCT/GB2016/053593
§ 371 (c)(1),
(2) Date: May 18, 2018

(87) PCT Pub. No.: WO2017/085495
PCT Pub. Date: May 26, 2017

(65) Prior Publication Data
US 2018/0375406 A1 Dec. 27, 2018

(30) Foreign Application Priority Data

Nov. 18, 2015 (GB) .................................. 1520343.3

(51) Int. Cl.
*H02K 7/06* (2006.01)
*H02K 11/215* (2016.01)
(Continued)

(52) U.S. Cl.
CPC .......... *H02K 11/215* (2016.01); *B21D 28/24* (2013.01); *B60T 13/745* (2013.01); *B60T 17/22* (2013.01);
(Continued)

(58) Field of Classification Search
CPC ...... H02K 11/215; H02K 7/06; H02K 5/1735; H02K 7/085; B21D 28/24; B60T 13/74;
(Continued)

(56) References Cited

U.S. PATENT DOCUMENTS 4,909,577 A * 3/1990 Harrison ............... B60T 8/3615
188/181 A
5,789,917 A * 8/1998 Oudet ...................... G01B 7/30
324/207.2
(Continued)

FOREIGN PATENT DOCUMENTS

EP 0549426 A1 6/1993
JP 2008109773 A 5/2008
(Continued)

OTHER PUBLICATIONS

GB Patents Act 1977: Search Report under Section 17(5), Application No. GB1520343.3, dated May 16, 2016.
(Continued)

*Primary Examiner* — Naishadh N Desai
(74) *Attorney, Agent, or Firm* — Robert James Harwood (57) ABSTRACT

A rotary position sensor assembly (10) for detecting the angular position of the rotor (104) of a motor. The assembly (10) includes at least one sensor (12) and a sensor target (14) which is moveable relative to the sensor (12). The sensor target (14) comprises a tubular body (16) with a plurality of integrally-formed radially-extending sections (18). These sections (18) include two radial upper edge portions (24) which are supported by a radially-extending support which is set back from the edge portions (24). Each of the two upper edge portions (24) provide a target for the sensor. A sensor target (14) for use in a position sensor assembly (10), a method of production of the sensor target (14), and an
(Continued)

electromechanical actuator which utilises the rotary position sensor assembly (10) are also provided.

19 Claims, 4 Drawing Sheets

(51) Int. Cl.
| | |
|---|---|
| *H02K 5/173* | (2006.01) |
| *H02K 7/08* | (2006.01) |
| *B21D 28/24* | (2006.01) |
| *B60T 13/74* | (2006.01) |
| *B60T 17/22* | (2006.01) |
| *F16D 65/16* | (2006.01) |
| *F16D 66/00* | (2006.01) |
| *F16H 25/22* | (2006.01) |
| *G01D 5/14* | (2006.01) |
| *F16H 25/20* | (2006.01) |

(52) U.S. Cl.
CPC ............ *F16D 65/16* (2013.01); *F16D 66/00* (2013.01); *F16H 25/2204* (2013.01); *G01D 5/145* (2013.01); *H02K 5/1735* (2013.01); *H02K 7/06* (2013.01); *H02K 7/085* (2013.01); *F16D 2066/003* (2013.01); *F16D 2250/0084* (2013.01); *F16H 2025/2078* (2013.01)

(58) Field of Classification Search
CPC ........ B60T 17/22; B60T 13/745; F16D 65/16; F16D 66/00; F16H 25/22; F16H 25/2204; G01D 5/14; G01D 5/145
See application file for complete search history.

(56) References Cited

U.S. PATENT DOCUMENTS

| | | |
|---|---|---|
| 6,100,682 A | 8/2000 | Schroeder |
| 2002/0158523 A1 | 10/2002 | Abadia et al. |
| 2004/0130314 A1 | 7/2004 | Bossoli et al. |
| 2006/0071563 A1* | 4/2006 | Fujii .................. H02K 5/1675 310/68 R |
| 2010/0072864 A1 | 3/2010 | Nguy et al. |
| 2014/0195186 A1 | 7/2014 | Carbonne et al. |
| 2014/0333295 A1 | 11/2014 | Fernandez et al. |
| 2015/0076972 A1 | 3/2015 | Leiber et al. |
| 2015/0097461 A1 | 4/2015 | Bulatow |

FOREIGN PATENT DOCUMENTS

| | | |
|---|---|---|
| WO | 2013118161 A1 | 8/2013 |
| WO | 2015150702 A2 | 10/2015 |

OTHER PUBLICATIONS

PCT International Search Report and Written Opinion, Application No. PCT/GB2016/053593, dated Jan. 13, 2017.

\* cited by examiner

POSITION SENSOR ASSEMBLY

CROSS-REFERENCE TO RELATED APPLICATIONS

This application is the National Phase of International Application PCT/GB2016/053593 filed Nov. 17, 2016 which designated the U.S. and that International Application was published in English under PCT Article 21(2) on May 26, 2017 as International Publication Number WO 2017/085495 A1. PCT/GB2016/053593 claims priority to British Application No. 1520343.3, filed Nov. 18, 2015. Thus, the subject nonprovisional application claims priority to GB1520343.3, filed Nov. 18, 2015. The disclosures of aforementioned applications are incorporated herein by reference.

BACKGROUND OF THE INVENTION

This invention relates to position sensor assemblies for use with electromechanical actuators, and to an electromechanical actuator including such as position sensor. It also relates to sensor targets for position sensor assembly and to a method of manufacture of a sensor target.

It is known to provide a position sensor assembly that is able to determine the angular position of an object that is free to rotate around an axis, such as a rotor of a motor. This type of sensor is sometimes called a rotary encoder, and converts the rotary motion into one or more output signals that have values that independently or when combined indicate the angular position of the rotating object.

One application of a position sensor assembly of this kind is to measure the position of a motor rotor for use in control of the position of the motor. Motors come in many forms, but one particular form that has been considered by the applicant is a motor that is integrated into an electromechanical actuator for a hydraulic braking system. Such actuators may be used to convert rotary motion of the motor into a linear motion of a plunger that is connected to a cylinder of a hydraulic braking circuit. A high degree of accurate control of the position of the motor is needed, and in most cases space is limited so that it is difficult to locate a position sensor.

In one arrangement, disclosed in U.S. Pat. No. 4,909,577, an electromagnetic actuator comprises a motor having a stator and a rotor. The rotor is hollow and is provided on an inner surface with a helical groove that forms part of a ball screw linear drive located inside the rotor. The drive comprises an elongate screw having an external helical groove that complements that of the rotor. The two grooves are filled with metal balls and the balls act on the screw to create a linear movement of the screw relative to the stator. The linear movement of the screw is used to control the hydraulic pressure in a hydraulic braking circuit of a vehicle. The rotor is supported by bearings at both ends.

In an alternative arrangement disclosed in the applicant's earlier patent EP0317182 a stepper motor has a screw that is fixed to the protruding end of the rotor of a motor so that as the rotor rotates the screw also rotates. The screw protrudes into a bore formed in an end face of a piston that is in turn inserted in the bore of a cylinder filled with hydraulic fluid. The piston is prevented from rotating in the cylinder, and as the rotor rotates, the piston is moved along the cylinder. This alters the pressure of the fluid in the hydraulic brake circuit connected to the cylinder.

It is an object of the invention to provide a position sensor apparatus suitable for use with an electric motor and in particular with a motor of an electromagnetic actuator of a hydraulic braking system.

SUMMARY OF THE INVENTION

According to a first aspect, the invention provides a rotary position sensor assembly for detecting the angular position of a rotor of a motor, the position sensor assembly comprising: at least one sensor; and a sensor target that is moveable relative to said sensor; the sensor target comprising a tubular body; and a plurality of substantially radially extending sections that are integrally formed with the tubular body; each radially extending section comprising two substantially radial upper edge portions, and a radially extending support set back from the upper edge portions, each of the upper edge portions providing a target for the sensor.

The two upper edge portions may be circumferentially offset around the tubular body. The support may include a base portion and two upstanding lips on which the upper edge portions are formed.

Each of the lips may extend axially away from the base portion, joining the base portion at a right angle. The lips may be integrally formed with the base portion.

The sensor target may be free of material at all points within an arcuate region bounded along each radial edge by the upper edge portions of adjacent radially extending sections. The inner edge of that region may correspond to the outer diameter of the tubular body portion.

The innermost ends of the lips of adjacent radially extending sections may be interconnected by arcuate edge portions of the main body of the sensor target. These arcuate edge portions may define an inner edge of the arcuate bounded region that is free of material.

The top edges of the arcuate portions may lie in the same plane as the upper edge portions of the radially extending sections.

The connections of the radially extending sections to the body, and the edges that connect the radially extending sections to adjacent radially extending sections, may all lie along a common circular path. This path may correspond to the diameter of the tubular body.

The sensor target may be formed using a deep drawing process from a metal blank. The radially extending sections and the tubular body may be integrally formed from a single blank. The blank may comprise a metal plate, preferably a metal disc. The disc may initially have a uniform thickness.

The upper edge portions of the sensor target may be generally planar and may all lie in a common first plane that may be orthogonal to the axis of rotation of the sensor target.

Where present, the base portions of each radially extending section may be generally planar and may all lie in a single plane that is orthogonal to the axis of rotation of the sensor target, this plane being offset from the first plane by the height of the lips on the edges. However, this is not essential to the invention and it may be preferable for the base portions to be set back further at the outer edge of the radially extending section than they are at the inner edge of the radially extending section. This will also mean the height of the lips will be lower toward an outermost edge of the radially extending section than at the inner edge of the radially extending section.

The outermost edge of each radially extending section, which is furthest from the connection to the tubular body, may also include an outermost upper edge portion that connects each of the two upper edge portions, forming a continuous upper edge. This helps give rigidity to the radially extending portions. These optional outermost upper edge portions, the upper edge portions and the optional arcuate edge portions together may form a continuous top rim of the sensor target.

The circumferential spacing between the upper edge portions of each radially extending section may be the same. Similarly, the regions between each of the supports which are free of material may be same circumferential length.

The edge of the sensor target may be linear and may extend radially from the inner edge of each support to the outer edge of each support.

The tubular body of the sensor target may extend axially away from the radially extending sections in the opposite direction to the upper edge portions. The tubular body may provide a protective cover for at least a portion of the rotor of the motor when in use, separating the rotor from the stator.

The end of the tubular body furthest from the radially extending sections may be of reduced diameter relative to a central portion of the main body, forming a narrowed portion.

The tubular body may comprise a thin walled tube. For instance, the tube may have a wall thickness for less than 1 percent, or less than 5 percent, of the diameter of the tubular body or even less.

Reducing the thickness reduces the weight, and it is sufficient for the body to maintain it shape in use and to support the flange.

The supports of the radially extending sections may have a thickness that is comparable to that of the walls of the tubular body, and may the thickness of the target segments may be substantially equal to that of the tubular body or greater.

The blank may comprise a metal disc. This may be a mild steel where the sensor(s) are magnetic sensors.

It is important, where magnetic sensors are used, that the support is placed far enough offset from the upper edge portions such that the sensors may identify the upper edge portions in the output signal of the sensor(s).

The upper edge portions may have a thickness of less than 10 mm, and preferably less than 1 mm. However, these dimensions are not limiting to the invention and the preferred dimensions of the lips will be dependent on the sensitivity of the sensor and the distance of the target from the sensor.

The blank may be of uniform thickness. The relative thickness of target segments and tubular body walls will depend on how the blank is drawn.

The sensor target may include at least four, and preferably at least 5, radially extending sections. It may comprise a greater or lesser number of sections depending on the number of poles of the motor. Preferably, the number of radially extending sections will be half the number of poles of the motor, such that the number of lips is equal to the number of poles.

The sensor target, or at least the upper edge portions of the radially extending sections of the sensor target, may be metal.

The sensor may comprise at least one magnetic sensor, such as a Hall effect sensor, that detects the passing of the upper edge portions of the radially extending sections as the sensor target rotates around its axis. There may be three magnetic sensors located at spaced locations around a circumferential path. These may be positioned so that an upper edge portion is only aligned with a subset of the sensors at any given time, and never aligned with all of the sensors.

According to a second aspect, the invention provides a sensor target for a position sensor, comprising: a tubular body; and a plurality of substantially radially extending sections that are integrally formed with the tubular body; each radially extending section comprising two substantially radial upper edge portions, and a radially extending support set-back from the upper edge portions, each of the upper edge portions providing a target for the sensor.

The sensor target may include any of the above preferable and/or optional features.

According to a third aspect, the invention provides a method of producing a sensor target for a position sensor of the first aspect comprising taking a blank and drawing the blank radially into a forming die using a punch.

The method may comprise drawing the blank using a first die and punch to create a part-formed sensor target, and subsequently drawing the part-formed sensor target using a second, different, die and punch.

Alternatively the blank may be turned into the finished sensor target in a single drawing step.

During the method of manufacture, an extrusion step may be performed in which a die is pressed through a pilot hole provided in the centre of the blank to draw the material down and outwards to form an intermediate tubular shape.

Simultaneously or in a separate step following the extrusion step the upper region of the intermediate tubular shape may be pressed down and regions flared outwards to form the flange segments and the lips. If completed in a single step, no further steps may be necessary.

The outer diameter of the flat blank may be smaller than the outer diameter of the flange sections but may also be larger than the final diameter of the main tubular body.

According to a fourth aspect the invention provides an electromechanical actuator for use in a hydraulic braking circuit of a vehicle comprising: an electric motor having a stator and a rotor, and a linear actuator that is located within the motor, in which:

The stator is located within a housing having a first end and a second end, the rotor is located inside the housing and comprises an elongate rotor body having a bore passing from one end of the body to the other, the bore being enlarged over a first portion of the body located towards the first end of the motor, and being of reduced size over a second portion of the body located towards the second end of the motor, the linear actuator comprising an elongate shaft that is located within the bore in the elongate rotor body, the shaft having a screw part at one end carrying an external thread that extends along a portion of the shaft that is located within the enlarged portion of the bore in the rotor body, and a fixing part at the other end shaft that is a tightly located into the bore of the second portion of the elongate body to prevent radial movement of the shaft relative to the elongate body, the linear actuator further comprising a drive nut that surrounds the screw part of the shaft and is located at least in a retracted position inside the enlarged bore of the first portion of the rotor body, the drive nut having an internal thread and being connected to the screw part through a set of balls that engage the threads of the drive nut and screw part, and further comprising a position sensor according to the first aspect of the invention in which the sensor target is secured to the rotor and the sensor is fixed to the stator or the housing.

The sensor target may be a press fit, perhaps an interference fit, into or onto the end of the first portion of the rotor body.

The tubular body of the sensor target may extend outward from the end face of the first portion, and yet may remain inside of the housing of the actuator. The tubular body may pass through the stator of the actuator. The tubular body may act as a shield separating the nut from the stator both physically and electromagnetically.

Various aspects of this invention will become apparent to those skilled in the art from the following detailed description of the preferred embodiment, when read in light of the accompanying drawings.

DETAILED DESCRIPTION OF THE PREFERRED EMBODIMENTS

Figure 1:
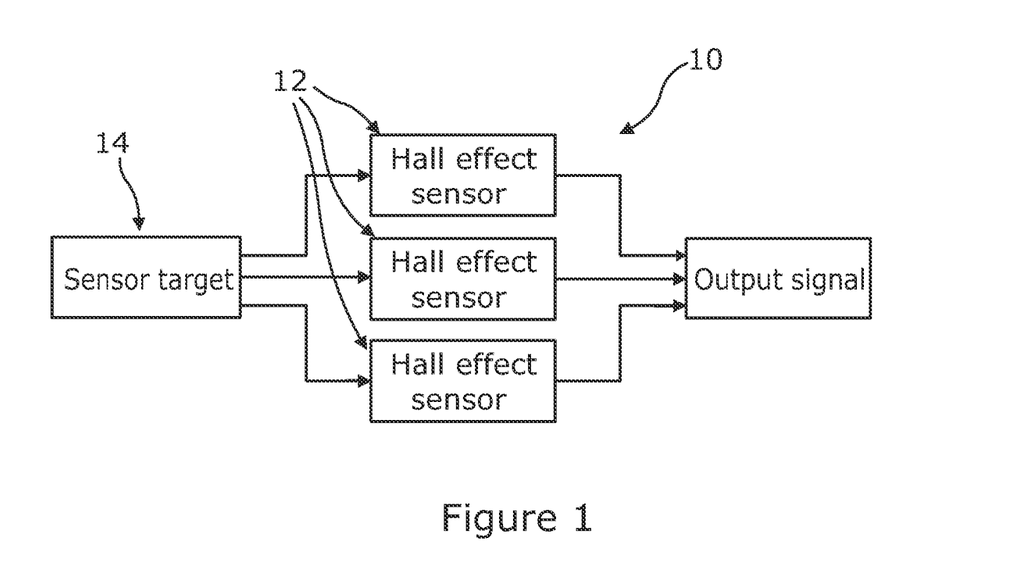
FIG. 1 is a schematic representation of the key parts of an embodiment of a position sensor assembly that falls within the scope of an aspect of the present invention.

FIG. 1 shows schematically a position sensor assembly 10 that falls within the scope of the first aspect of the present invention. The sensor 10 is suitable for measuring the angular position of any object that rotates around a fixed axis, for example the rotor of a motor. This kind of position sensor is sometimes referred to as a rotary encoder. The position sensor assembly 10 converts movement of the rotor into a changing output signal or signals, the pattern of change or the instantaneous values of the output signal or signals providing a measure of the angular position. Depending on the configuration of the position sensor this output may provide an unambiguous position measurement over only part of a rotation of the rotor, or a whole rotation, or over a number of rotations.

Figure 2:
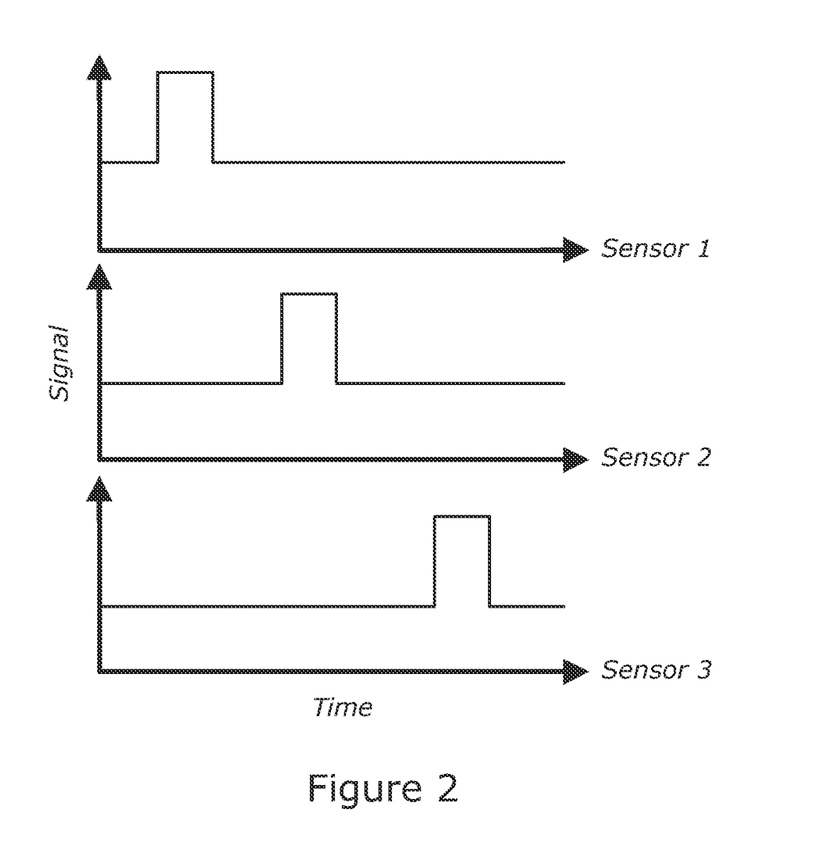
FIG. 2 shows how the output of one sensor varies over time as a metal object is moved into and then out of the zone of detection of the sensor.

The position sensor assembly 10 comprises one or more sensors 12, in this example three Hall effect sensors. The sensors 12 are supported by an annular circuit board and are spaced around a circumference of the board. Each Hall effect sensor 12 produces an output signal that has one value when a metal target is within the zone of detection of the sensor and a second value when there is no metal target present. FIG. 2 shows the output signal changing over time as a metal object is passed through the zone of detection, the change in value corresponding to the edges of the target entering and then leaving the zone.

The position sensor assembly 10 also includes a sensor target 14. The function of the sensor target 14 is to define multiple metal targets that will move past the sensors 12 as the sensor target 14 rotates around an axis. By fixing the sensor target 14 to a rotor of a motor, for example, continuous rotation of the rotor in one direction will cause each of the metal targets to move through the zone of detection of each of the three sensors in a sequence.

Figure 3:
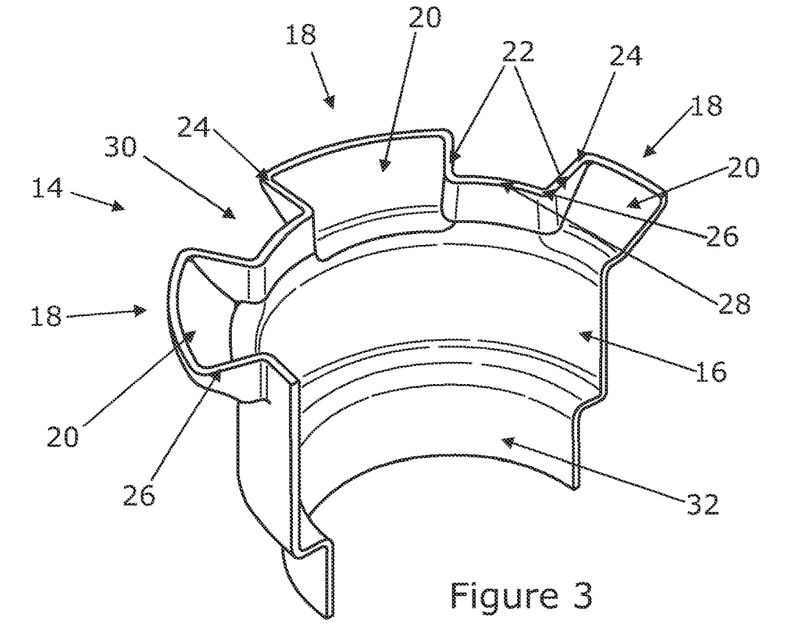
FIG. 3 shows in detail an exemplary sensor target.

The sensor target 14 in this embodiment is shown in FIG. 3 of the drawings. The sensor target 14 comprises a tubular body 16 and a plurality of generally radially extending sections 18 that are preferably integrally formed with the tubular body 16, each radially extending section 18 comprising a radially extending support, in this case having a base portion 20 set-back from two upstanding lips 22 which form two substantially radial upper edge portions 24, which in this embodiment are connected to form a continuous upper edge. Each support is connected along one edge to the tubular body 16, the support being circumferentially spaced apart from the supports of adjacent radially extending sections 18.

Figure 4:
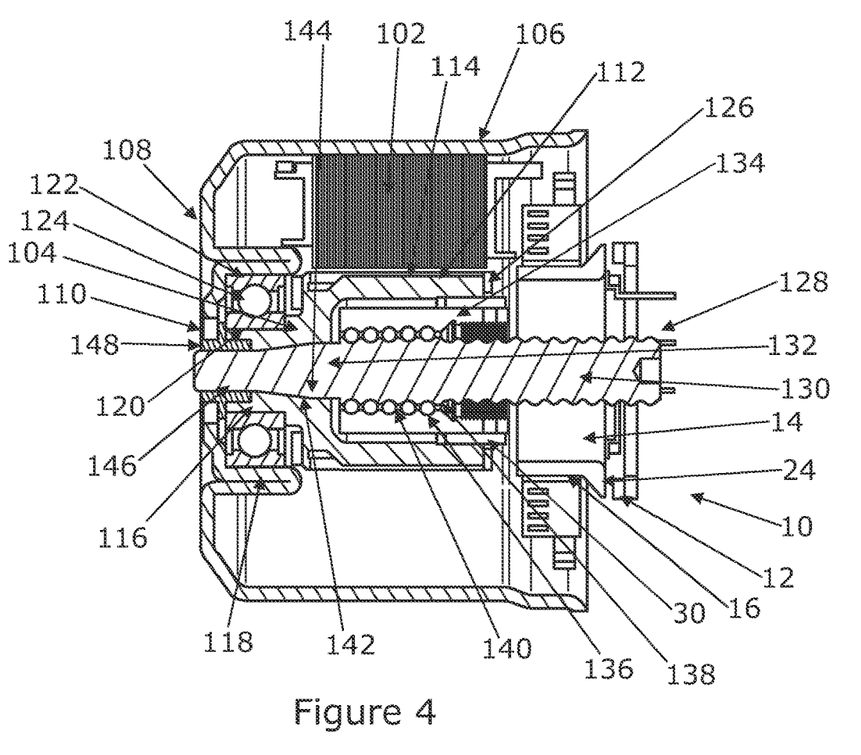
FIG. 4 is a cross section along a vertical plane of a first embodiment of an electromagnetic actuator that falls within the scope of a further aspect of the present invention.
Figure 5:
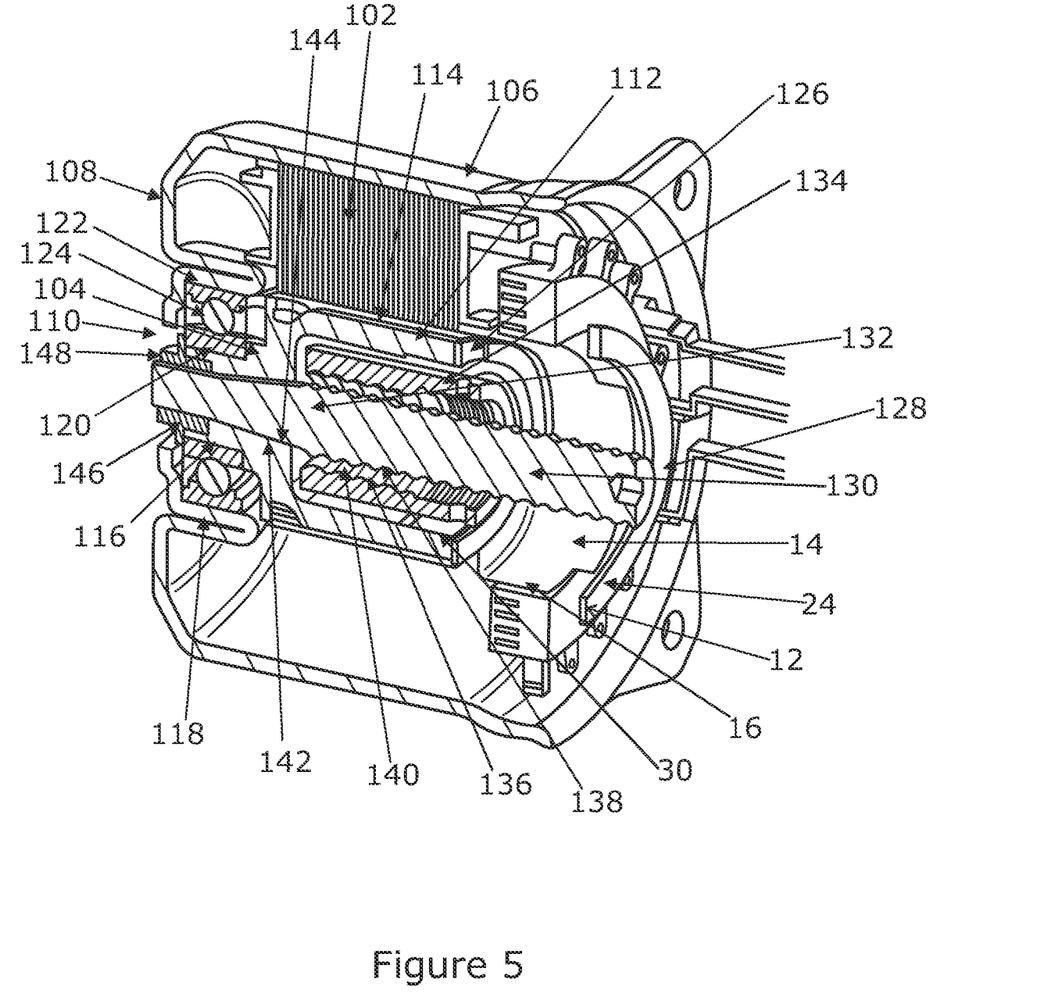
FIG. 5 is a perspective view of the actuator of FIG. 1.

The body 16 is located close to the sensors 12, as shown in FIGS. 4 and 5, so that the upper edge portions 24 pass through the zone of detection of each sensor 12 as the body 16 rotates around its central axis. These upper edge portions 24 therefore define the metal targets for the sensor 12. Importantly the support, for instance the base portion 20, and the main body 16 are far enough away from the sensor 12, as determined by the height of the lips 22 and the sensitivity of the sensors 12 as well as the proximity of the sensors 12 to the upper edge portions 24. The sensors 12 may therefore not detect, or will be able to differentiate between, the upper edge portions 24 and the support and main body 16.

The radially extending sections, although described with reference to the present embodiment, may be constructed in different ways. Importantly, radially extending edges should be present which are detectable by the sensors of the position sensor. Furthermore, the support should be set-back from the level of the upper edge portions, such that detection of the support by the sensors is prevented or limited. As such, other possible constructions of the radially extending sections may include depressions or voids formed between the upper edge portions. The support may therefore be of a trough or bowl-like construction, without necessarily having a distinct base or lips.

Each of the lips 22 extend in a direction parallel to the rotational axis of the main body 16. As such, they join the base portion 20 at a 90 degree angle. This angle is beneficial, as any gradual increase or decrease in the signal detected by the sensors 12 may be avoided.

In the present embodiment, each lip 22 is joined at its innermost end 26 to an adjacent lip 22 by an arcuate edge portion 28. The arcuate edge portions 28 and the upper edge portions or lips 22 which each portion 28 interconnects, form the inner edge and radial edges of an arcuate region 30 which is free of material. The inner edge of the arcuate region 34 corresponds to the outer diameter of the tubular body 16 in order to ensure the maximum efficiency of manufacture. However, it may be possible for the inner edge to be at a different radial distance. Importantly, this distance should not interfere with the sensing of the upper edge portions by the sensors. Similarly, the plane defined by the top faces of the arcuate edge portions 28 is coincident with that of the upper edge portions 24. Thus, minimal clearance is required for the mounting of the sensors 12 above the sensor target 14. If clearance is not an issue, alternative arrangements may instead be used.

The end of the main body 16 opposite the flange sections 18 includes a narrowed portion 32 having a smaller diameter than that of the main body 16. The narrowed portion 32 may therefore be enabled to fit with adjacent components in an assembly, as is described in more detail below.

The position sensor assembly may be included in an electromechanical actuator such as that shown in FIGS. 4 and 5 of the drawings. The actuator comprises two main function parts: a permanent magnet motor having a stator and a rotor, and a linear actuator comprising a drive screw that is secured to the rotor and a drive nut that is connected to the screw through a set of balls.

The motor in this example comprises a stator part 102 and a rotor part 104, both of which are housed within a housing 106 in the form of a cast or drawn metal can. The housing has a cylindrical outer wall that is open at one end (to the right in the Figures) and closed at a second end by a cap. The cap 108 at the closed end is provided with an access hole 110 that is concentric with the axis of the housing (passing through the can from one end to the other), the access hole 110 having a diameter about 10 percent of the diameter of the outer wall of the housing.

Securely located inside the housing towards the open first end is a stator assembly 102. In this example the stator assembly comprises a stack of metal plates around which coils of wire are turned.

Located within the housing, and extending from one end to the other, is a rotor assembly. This comprises a hollow elongate body 112 that is stepped in diameter approximately one third of the way along its length. A first part 114 of the stepped hollow rotor body, located furthest from the closed end of the can and inside the stator 102, has a diameter approximately half of the diameter of the outer can, and a relatively thin wall thickness to define an enlarged cylindrical bore within the first part that is open at the end of the rotor body to face the first end of the housing. The second part 116 of the rotor body that is closest to the closed base of the outer can has a diameter of about ⅕th of the diameter of the can. The first part 114 and the second part 116 are joined by a step change in diameter of the cylindrical structure. A bore extends continuously from one end of the rotor body to the other, passing through the smaller diameter second part and the larger diameter first part. This bore has a smaller diameter inside the second part.

A first function of the smaller diameter second part 116 is to secure the rotor structure to the housing, and this is achieved by pressing a four point contact bearing assembly 118 onto the outside of the second part 116 of the rotor body 112. The bearing has an inner race 120 that contact the rotor body, and an outer race 122 that is in turn press fitted onto a locating ring formed in the cap 108 on the inside of the housing. The inner and outer races are connected by ball bearings 124. The bearing assembly is a four point contact bearing assembly and has zero clearance in the radial and axial directions.

The bearing assembly comprising of 120, 122 and 124 ensures that the rotor body is securely located inside the can, and so cannot move axially or radially, or tilt, relative to the stator assembly 102. By providing a support only at one end of the rotor body by a single bearing, and having no bearing towards the open second end of the housing, it becomes possible to reduce the overall length of the assembly by locating a screw and nut ball drive inside the enlarged bore of the rotor body as will now be described.

The larger diameter first part 114 of the rotor 112 serves two functions. The first is to support a stack of permanent magnets 126 around its outer face that cooperate with the stator in a known manner to produce a torque in the rotor as current is applied to the stator. The manner in which this torque is produced is not material to the invention and so will not be explained in any detail.

The second function of the first portion 114 is to define a space into which the drive screw and drive nut of a linear actuator are located. The screw is formed on a part of a shaft 128 that passes right along the rotor body 112 from one end to the other.

The shaft comprises a screw part 130 and a fixing part 132. The fixing part 132 has a reduced diameter and is located in the bore of the second part 116 of the rotor body. The screw part is located inside the enlarged bore of the rotor body. As shown the drive nut 134 is located inside the rotor body. The drive nut 134 has a helical groove 136 on an inner surface that faces a complimentary helical groove 138 on the screw part of the shaft. Balls 140 are located in these grooves so that the drive nut and screw part together form a ball driven linear actuator.

The fixing part of the shaft includes a gently tapered portion 142, which matches a gentle tapered portion 144 of the bore in the second portion of the rotor body. This allows the shaft to be inserted into the bore by press fitting it from the open first end of the housing, the taper ensuring the screw is correctly self-centred. This tapered face allows any axial load applied to the screw due to loading of the nut to be resisted by the rotor, and importantly this load is carried over a relatively large area. Additionally, the taper serves to lock the shaft 128 into the rotor assembly 112 such that torque may be transmitted across the interface between these two parts without requiring any key-way, dowel pins or other locking feature besides the tight fit of the two parts provided by the clamping action of the screw thread 146 and nut 148.

To secure the shaft 128 to the rotor body 112, a terminal portion of the fixed part of the shaft 128 is provided with a preferably fine screw thread 146. Access to the thread 146 is achieved by oversizing the bore in the rotor second portion at its open end. A locking nut 148 is then tightened onto this screw thread from outside of the closed end of the can, accessing the thread through the hole 110 in the closed end of the can. As can be seen this locking nut pulls the fixing part into the rotor body and also traps the inner race of the bearing assembly against the rotor so that together the inner race, rotor and screw are rigidly secured. This can be performed simply after the rotor is pressed into place and then the shaft inserted.

The drive nut is not prevented from rotating by the stator, in this example the drive nut being prevented from rotating through its connection to a further component that is separate from the actuator. This means the drive nut does not need to contact the stator, reducing friction. In use, as the rotor rotates the drive nut will move along the nut. The direction of movement of the nut depends on the direction of rotation of the motor, and on the handedness of the threads.

The position sensor 10 is located at the open end of the actuator from which the drive nut can be accessed. The narrowed portion 30 of the main tubular body 16 of the sensor target 14 is press fitted into the open enlarged bore of the first part 114 of the rotor body 112, and the sensors 12 are secured adjacent to the sensor target 14 so that the upper edge portions 24 are in close proximity to the sensors 12. As the rotor 104 rotates, the upper edge portions 24 move past each of the sensors 12 once for each revolution. The sequence of upper edge portions 24 passing the sensors 12 can be used to determine the angular position of the sensor target 14, and hence the position of the rotor 104. The output of each of the sensors 12 is fed to a controller which converts the outputs into a position signal. A number of processes could be used to do this, and will be familiar to anybody skilled in the art of rotary encoders. As such a detailed description of the process will not be give here. For additional detail, the reader is referred to WO2015/004472.

Figure 6A:
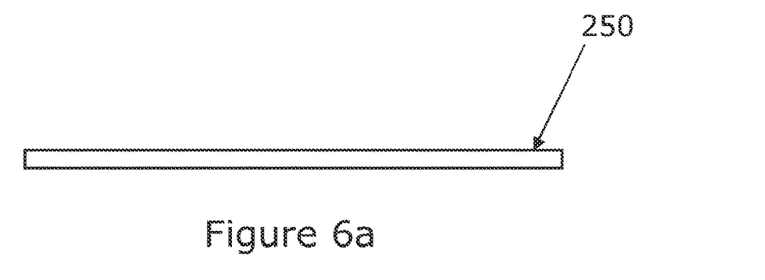
FIGS. 6a to 6c show how the target sensor can be manufactured from a flat metal blank.
Figure 6B:
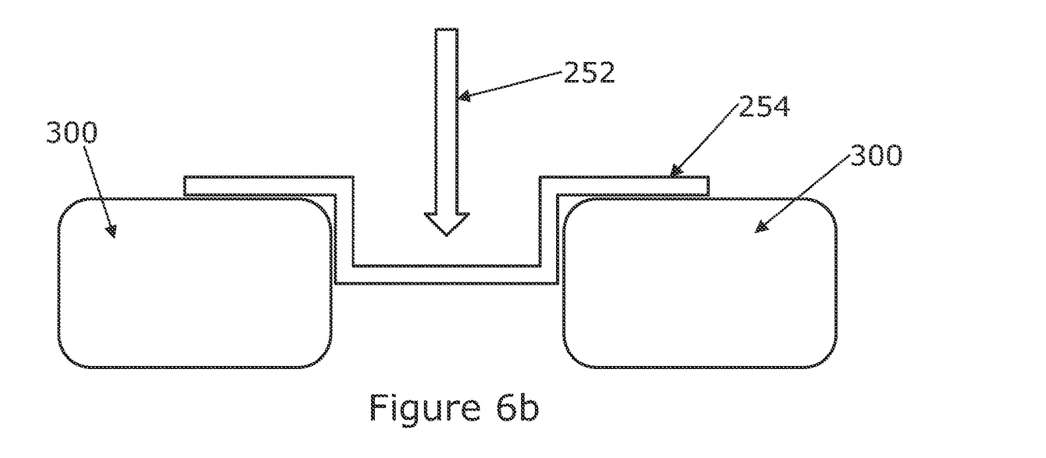
Figure 6C:
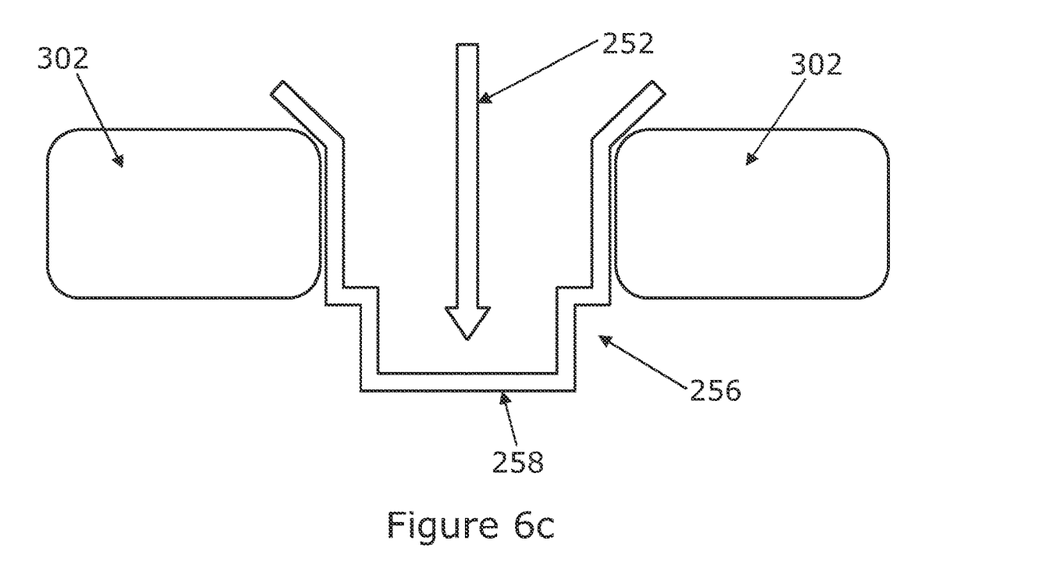

One method of producing the sensor target 14 will now be described and is depicted in FIGS. 6a to 6c. The method is based on a process of deep drawing to turn a flat disc shaped metal blank 250 into the required shape of the sensor target 14. This process comprises the pressing of the blank into a die 300 using a punch 252. The shape of the die and punch correspond to the outer and inner shapes of the sensor target. The die and punch and pressed together under sufficient force to cause the material of the blank to flow into the required shape.

In the depicted process, the blank 250 is formed into the sensor target in a two step process. The first step results in the blank 250 forming a first intermediate component 254. The intermediate component is then pressed into a second die 302 to form a second intermediate component 256. A blank end 258 of the second intermediate component may then be removed, resulting in the finished sensor target.

Other methods of production may also be provided. For instance, the sensor target may be manufactured in a single step process, if desired, using a complex die, for example such that no post-processing material removal is necessary. Additional steps may also be taken, to form the desired shape, such as additional or different post-processing material removal.

The principle and mode of operation of this invention have been explained and illustrated in its preferred embodiment. However, it must be understood that this invention may be practiced otherwise than as specifically explained and illustrated without departing from its spirit or scope.

The invention claimed is:

1. A rotary position sensor assembly for detecting the angular position of a rotor of a motor, the position sensor assembly comprising:
    at least one sensor; and
    a sensor target that is moveable relative to said sensor; the sensor target comprising a tubular body; and
    a plurality of substantially radially extending sections that are integrally formed with the tubular body; each radially extending section comprising two substantially radial upper edge portions, and a radially extending support set back from the upper edge portions, each of the upper edge portions providing a target for the sensor.

2. A position sensor as claimed in claim 1, wherein the two upper edge portions are circumferentially offset around the tubular body.

3. A position sensor as claimed in claim 1, wherein the support includes a base portion and two upstanding lips on which the upper edge portions are formed.

4. A position sensor as claimed in claim 3, wherein each lip extends axially away from the base portion, joining the base portion at a right angle.

5. A position sensor as claimed in claim 3, wherein the lips are integrally formed with the base portion.

6. A position sensor as claimed in claim 1, wherein the sensor target is free of material at all points within an arcuate region bounded along each radial edge by the upper edge portions of adjacent radially extending sections.

7. A position sensor as claimed in claim 6, wherein the inner edge of the arcuate that region corresponds to the outer diameter of the tubular body portion.

8. A position sensor as claimed in claim 1, wherein the sensor target is formed using a deep drawing process from a metal blank.

9. A position sensor as claimed in claim 1, wherein the radially extending sections and the tubular body may be integrally formed from a single blank.

10. A position sensor as claimed in claim 9, wherein the blank comprises a metal plate, preferably a metal disc, optionally having a uniform thickness.

11. A position sensor as claimed in claim 1, wherein the upper edge portions all lie in a common first plane which is preferably orthogonal to the axis of rotation of the sensor target.

12. A position sensor as claimed in claim 1, wherein the sensor is a magnetic sensor for detecting the passing of the upper edge portions of the radially extending sections as the sensor target rotates around its axis, preferably a Hall effect sensor.

13. A sensor target for a position sensor, comprising:
    a tubular body; and
    a plurality of substantially radially extending sections that are integrally formed with the tubular body;
    each radially extending section comprising
        two substantially radial upper edge portions, and
        a radially extending support set-back from the upper edge portions, each of the upper edge portions providing a target for the sensor.

14. A method of producing a sensor target for a position sensor as claimed in claim 1, the method comprising the steps of:
    taking a blank and drawing the blank radially into a forming die using a punch.

15. A method as claimed in claim 14, further comprising the steps of:
    using a first die and punch to create a part-formed sensor target, and subsequently drawing the part-formed sensor target using a second, different, die and punch.

16. A method as claimed in claim 14, wherein the blank is turned into the finished sensor target in a single drawing step.

17. An electromechanical actuator for use in a hydraulic braking circuit of a vehicle, comprising:
    an electric motor having a stator and a rotor; and
    a linear actuator that is located within the motor; in which
        the stator is located within a housing having a first end and a second end,
        the rotor is located inside the housing and comprises an elongate rotor body having a bore passing from one end of the body to the other,
        the bore being enlarged over a first portion of the body located towards the first end of the motor, and being of reduced size over a second portion of the body located towards the second end of the motor,
        the linear actuator comprising an elongate shaft that is located within the bore in the elongate rotor body,
        the shaft having a screw part at one end carrying an external thread that extends along a portion of the shaft that is located within the enlarged portion of the bore in the rotor body, and a fixing part at the other end shaft that is tightly located into the bore of the second portion of the elongate body to prevent radial movement of the shaft relative to the elongate body,
        the linear actuator further comprising a drive nut that surrounds the screw part of the shaft and is located at least in a retracted position inside the enlarged bore of the first portion of the rotor body, the drive nut having an internal thread and being connected to the screw part through a set of balls that engage the threads of the drive nut and screw part,
        and further comprising a position sensor in which the sensor target is secured to the rotor and the sensor is fixed to the stator or the housing.

18. An electromechanical actuator as claimed in claim 17, wherein the sensor target is a press fit into or onto the end of the first portion of the rotor body.

19. An electromechanical actuator as claimed in claim 18, wherein the press fit is an interference fit.

* * * * *